United States Patent [19]

Braunstein et al.

[11] Patent Number: 5,756,634
[45] Date of Patent: May 26, 1998

[54] LIQUID ONE COMPONENT PU STOVING ENAMELS

[75] Inventors: Richard Braunstein, Dorsten; Felix Schmitt, Herten; Elmar Wolf, Recklinghausen, all of Germany

[73] Assignee: Huels Aktiengesellschaft, Marl, Germany

[21] Appl. No.: 707,297

[22] Filed: Sep. 3, 1996

[30] Foreign Application Priority Data

Sep. 1, 1995 [DE] Germany ............... 195 32 294.0

[51] Int. Cl.$^6$ ................................. C08G 18/74
[52] U.S. Cl. .............. 528/45; 428/423.1; 428/425.8; 528/55; 528/59; 528/65
[58] Field of Search ............... 528/45, 55, 59, 528/65; 428/423.1, 425.8

[56] References Cited

U.S. PATENT DOCUMENTS

| | | | |
|---|---|---|---|
| 5,143,994 | 9/1992 | Laas et al. | 528/45 |
| 5,330,839 | 7/1994 | Yasuoka et al. | 528/45 |
| 5,461,135 | 10/1995 | Malofsky et al. | 528/45 |
| 5,541,279 | 7/1996 | Gras et al. | 528/45 |

*Primary Examiner*—John M. Cooney, Jr.
*Attorney, Agent, or Firm*—Oblon, Spivak, McClelland, Maier & Neustadt, P.C.

[57] ABSTRACT

A liquid one-component PU stoving enamel is provided along with its synthesis, where the stoving enamel contains a) a hydroxyl-containing polymer;

b) a partially or totally blocked isophorone-based polyisocyanate containing uretdione groups;

c) an organic bismuth compound catalyst, and d) an organic solvent or mixture of two or more organic solvents, wherein components a and b are present in a total (a+b) amount of from 40 to 70 parts by weight based on total composition weight, component c is present in an amount of from 0.5 to 5 parts by weight based on total composition weight; and component d is present in an amount of from 30 to 60 parts by weight based on total composition weight; and wherein a and b are each present in amounts sufficient to provide an OH/NCO equivalents ratio of from 0.8 to 1.2 NCO equivalents of component b per OH equivalent of component a.

19 Claims, No Drawings

LIQUID ONE COMPONENT PU STOVING ENAMELS

BACKGROUND OF THE INVENTION

1. Field of the Invention

The present invention relates to liquid polyurethane (PU) stoving enamels of high solids content which can be used as one-component systems (1-component PU stoving enamels).

2. Discussion of the Background

Stoving enamels based on hydroxyl-containing polyesters which are crosslinked with polyisocyanates containing uretdione groups are known. DE 30 30 554 describes stoving enamels consisting of hydroxyl-containing polymers (optionally polyesters), a partially or totally blocked uretdione of isophorone diisocyanate (IPDI), which is chain-extended with glycols if desired, and an organic solvent. When urethane catalysts are added to these stoving enamels in order to reduce the stoving temperature, they are no longer stable on storage at room temperature, and certainly not at moderately elevated temperatures (50° C.). Although not explained in DE '554, the present inventors have determined that the cause of this deficient storage stability is the reaction of the uretdione group with the OH groups of the polyol present in the mixture, with the formation of allophanate groups:

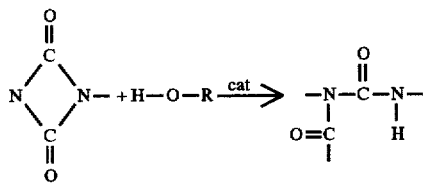

SUMMARY OF THE INVENTION

Accordingly, one object of the present invention is to provide a one component PU stoving enamel having both reduced curing temperature and improved shelf life, even at moderate temperature.

A further object of the present invention is to provide a method for the preparation of such one-component PU stoving enamels.

A further object of the present invention is to provide a metal coil coated with a cured coating of the one-componenet PU stoving enamel.

These and other objects of the present invention have been satisfied by the discovery that, through the use of bismuth salts of organic acids as catalysts, it is possible to reduce the curing temperatures of the 1-component PU stoving enamels described in DE 30 30 554 without at the same time adversely affecting their storage stability.

DETAILED DESCRIPTION OF THE PREFERRED EMBODIMENTS

The present invention relates to a liquid one-component PU stoving enamel comprising a) a hydroxyl-containing polymer having a hydroxyl number of between 10 and 300 mg of KOH/g, b) a partially or totally blocked polyisocyanate containing uretdione groups, preferably based on isophorone diisocyanate, c) an organic bismuth compound having the following formula:

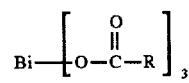

in which R is a linear, branched or cyclic aliphatic hydrocarbon radical having 1 to 16 carbon atoms, d) an organic solvent or mixture of two or more organic solvents, wherein components a and b (a+b) are present in an amount of from 40 to 70 parts by weight based on total composition weight, component c is present in an amount of from 0.5 to 5 parts by weight based on total composition weight; and component d is present in an amount of from 30 to 60 parts by weight based on total composition weight; and wherein a and b are present in amounts sufficient to provide an OH/NCO equivalents ratio of from 0.8 to 1.2 NCO equivalents of component b per OH equivalent of component a.

As hydroxyl-containing polymers (component a) that can be used in accordance with the present invention, preference is given to hydroxyl-containing polyesters of aliphatic, cycloaliphatic and/or aromatic polycarboxylic acids, having hydroxyl numbers of between 25 and 150 mg of KOH/g. For this application the polyesters preferably should additionally possess a low glass transition temperature, i.e. between 20° and −25° C. Furthermore, appropriate polyesters possess more than two OH groups on average per molecule.

Examples of suitable aliphatic, cycloaliphatic and mono- or polycyclic aromatic polycarboxylic acids include oxalic acid, succinic acid, glutaric acid, 2,2-dimethylglutaric acid, adipic acid, 2,2,4- and 2,4,4-trimethyladipic acid, sebacic acid, dodecanedicarboxylic acid, terephthalic acid, methyl-terephthalic acid, 2,5- and 2,6-dimethylterephthalic acid, chloroterephthalic acid, 2,5-dichloroterephthalic acid, fluoroterephthalic acid, isophthalic acid, phthalic acid, trimellitic acid, naphthalenedicarboxylic acid, (especially the 1,4, 1,5, 2,6 and 2,7 isomers), phenylenediacetic acid, 4-carboxyphenoxyacetic acid, m- and p-terphenyl-1,4"-dicarboxylic acid, dodecahydrodiphenic acid, tetrahydrophthalic acid, hexahydrophthalic acid, hexahydroterephthalic acid, 4,4'-diphenic acid, 2,2'- and 3,3'-dimethyl-4,4'-diphenic acid, 2,2'-dibromo-4,4'-diphenic acid, bis(4-carboxyphenyl)methane, 1,1- and 1,2-bis(4-carboxyphenyl)ethane, 2,2-bis(4-carboxyphenyl)propane, 1,2-bis(4-carboxyphenoxy)ethane, bis-4-carboxyphenyl ether, bis-4-carboxyphenyl sulfide, bis-4-carboxyphenyl ketone, bis-4-carboxyphenyl sulfoxide, bis-4-carboxyphenyl sulfone, 2,8-dibenzofurandicarboxylic acid, 4,4'-stilbenedicarboxylic acid and octadecahydro-m-terphenyl- 4,4"-dicarboxylic acid. Unsaturated acids which can be derived from the acids mentioned above can also be used.

It is also acceptable to use the functional derivatives of the above acids, such as anhydrides, esters, amides, etc. The acids or their functional derivatives can be used singly or as mixtures of two or more of the above-mentioned compounds.

As the alcohol component for preparing the hydroxyl-containing polyesters, preference is given to the use of diols. Other polyols, such as triols, can be used in part. Examples of suitable diols are ethylene glycol, propylene glycols, such as 1,2- and 1,3-propanediol and 2,2-dimethyl-1,3-propanediol, butanediols, such as 1,3-butanediol and/or 1,4-butanediol, 3-methyl-1,5-pentanediol, hexanediols, such as 1,6-hexanediol and 2,2,4(2,4,4)-tri-methyl-1,6-hexanediol, 1,7-heptanediol, thioglycol, 1,18-octadecanediol, 2,4-dimethyl-2-propyl-1,3-heptanediol, butene- or butyne-1,4- diol, diethylene glycol, triethylene glycol, cis- and trans-1,4-cyclohexanedimethanol, 1,4-cyclohexanediols, 2,2-bis(4-hydroxycyclohexyl)propane, bisethoxylated 2,2-bis(4-hydroxyphenyl)propane, neopentylglycol hydroxypivalate. Examples of other suitable polyols include: glycerol, 1,2,6-hexanetriol, 1,1,1-trimethylolpropane, 1,1,1-trimethylolethane, and pentaerythritol. The hydroxyl group-containing compounds can be used singly or as mixtures of two or more of the above-mentioned compounds.

In the preparation of the polyesters, the polyol is used in quantities such that there is more than 1 OH-group equivalent per carboxyl-group equivalent, so that polyesters having the required characteristics are obtained. The polyesters obtained are resins of relatively high viscosity.

The hydroxyl-containing polyesters can be prepared using conventional procedures, such as by esterification or transesterification, in the absence or presence of catalysts.

Starting materials (component b) for the liquid 1-component PU stoving enamels according to the present invention are polyisocyanates which have uretdione groups and are based on isophorone diisocyanate, as described in DE-A 30 30 513 and 37 39 549, the relevant portions of which are hereby incorporated by reference. The NCO content of a IPDI-uretdione of this type is 17–18%. In other words, more or less high proportions of polyuretdiones of the IPDI are present in the reaction product. The monomer content is preferably <1% and the NCO content of the reaction product after heating at 180°–200° C. is preferably 37.1–37.7%.

For the preparation of component b according to the present invention, the uretdione group-containing isophorone diisocyanate (IPDI-uretdione for short) is reacted with one or more diols in a NCO/OH equivalents ratio of 1:(0.5–0.9) or (0.5–0.9):1. If the NCO/OH equivalent ratio used is 1:(0.5–0.9), the resulting adduct is reacted totally or partially with one or more blocking agents (such as ε-caprolactam, oximes, monoalcohols, or secondary monoamines).

The diols used for chain extension of the IPDI-uretdione are dihydric (cyclo)aliphatic alcohols, such as ethylene glycol, 1,2- and 1,3-propylene glycol, 1,4-butanediol, 2-ethyl-1,6-hexanediol, 1,6-hexanediol, 1,8-octanediol, neopentylglycol, 1,4-bis-hydroxymethylcyclohexane, 2-methyl-1,3-propanediol, 3-methyl-1,5-pentanediol, diethylene glycol, triethylene glycol, tetraethylene glycol, dipropylene glycol and dibutylene glycol. In some cases it has been found expedient to subject the diol, used for chain extension of the IPDI-uretdione, to molecular enlargement by condensation with an aliphatic dicarboxylic acid, in accordance with the following equation:

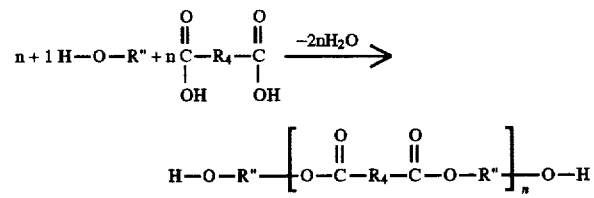

in which n is 1–6 and R₄ is an unsubstituted or alkyl-substituted alkylene radical having 2–36 carbon atoms.

In component b, the NCO groups are partially or totally blocked. Suitable blocking agents include ε-caprolactam, oximes (such as acetone oxime, methyl ethyl ketone oxime, cyclohexanone oxime, acetophenone oxime, and benzophenone oxime), monoalcohols (such as methanol, ethanol, 2-ethylhexanol, n-butanol, n-decanol and cyclohexanol), and secondary monoamines (such as dipropylamine, dibutylamine and dicyclohexylamine).

The preparation of the component b useful for the 1-component PU stoving enamels of the present invention is straightforward. The IPDI-uretdione is generally heated at 50°–80° C. in the presence of an appropriate solvent (such as toluene, xylene and aromatic hydrocarbons, methylglycol acetate, ketones and any desired mixtures of these and other inert organic solvents), with the chain extender and the diol, until the desired NCO content is reached. If after reaction free NCO groups are still present—which is the case if the NCO/OH equivalents ratio of the reactants is 1:(0.5–0.9)—the reaction mixture is reacted in a known manner, totally or partially, with the stated blocking agents. Preferably, the blocking agent is added at about 70° C. to the reaction solution at a rate such that the temperature of the reaction mixture does not exceed about 80° C. After the blocking agent has been added, the mixture is then heated further until the desired NCO content is reached. Component b can also be prepared in the reverse sequence, i.e. first reaction of the IPDI-uretdione with the blocking agent and then reaction with the diol.

Examples of suitable bismuth salts (component c) are bismuth acetate, bismuth propionate, bismuth trimethylacetate, and bismuth neododecanoate.

The reaction of the hydroxyl-containing polyesters with the polyisocyanates liberated by deblocking is accelerated by the bismuth catalysts, which are essential to the invention. The bismuth catalysts are present in quantities of from 0.5 to 5 parts by weight. The bismuth catalyst results in reduction of the curing temperatures relative to the prior art. By using the bismuth salts, however, there is no adverse effect on the storage stability of the 1-component PU stoving enamels.

Solvents (component d) suitable for the 1-component PU stoving enamels according to the present invention are those whose boiling point is at least 100° C. The boiling point of the solvent used depends on the respective stoving temperatures. The higher these temperatures, the higher may be the boiling points of the solvents to be used. Suitable solvents include aromatic hydrocarbons, such as toluene or xylene (including technical-grade mixtures), tetrahydronaphthalene, or cumene; ketones, such as methyl isobutyl ketone, diisobutyl ketone or isophorone, or esters, such as n-hexyl acetate, ethylglycol acetate, n-butylglycol acetate or methoxypropyl acetate. These solvents can be used singly or as mixtures of two or more compounds.

In order to improve the levelling properties of the 1-component PU stoving enamel, so-called levelling agents are added during preparation. These agents may be chemical compounds, or mixtures thereof, of widely varying chemical type, such as polymeric or monomeric compounds. Suitable examples include acetals, such as polyvinylformal, polyvinylacetal, polyvinylbutyral, polyvinylacetobutyral, di-2-ethylhexylisobutyraldehyde acetal, di-2-ethylhexyl-n-butyraldehyde acetal, diethyl-2-ethylhexanol acetal, di-n-butyl 2-ethylhexanol acetal, diisobutyl 2-ethylhexanol acetal, or di-2-ethylhexyl acetaldehyde acetal, ethers, such as the polymeric polyethylene and polypropylene glycols, copolymers of n-butyl acrylate and vinyl isobutyl ether, ketone-aldehyde condensation resins, solid silicone resins, silicone oils or mixtures of zinc soaps of fatty acids and aromatic carboxylic acids. Such levelling agents can be present in the batches in quantities of up to 3.0% by weight based on the overall quantity of binder (polyester+blocked polyisocyanate), crosslinking catalyst and solvent or solvent mixture.

The other constituents of the stoving enamel, such as dyes, pigments, fillers, such as titanium dioxide, carbon black, organic and inorganic color pigments, talc, heavy spar, thixotropic agents, UV stabilizers and antioxidants, can vary relative to the quantity of binder (polyester+blocked polyisocyanate containing uretdione groups), crosslinking catalyst and solvent or solvent mixture, depending on the intended application of the stoving enamel, and in accordance with conventional amounts used in the art.

The partially or totally blocked IPDI-based polyisocyanates containing uretdione groups are readily compatible with the hydroxyl-containing polymers and in organic solvents give homogeneous solutions which are highly suitable for use as a stoving enamel. The curable mixtures according to the present invention possess very good stability on storage at room temperature, (i.e. they are not altered either physically or chemically); thus, the constituents of the stoving enamels do not react at room temperature. Depending on the application, the stoving enamels of the present invention are cured in the temperature range of 100°–350° C., preferably from 130° to 300° C., within a period of from 40 minutes down to 20 seconds. Curing is accompanied by deblocking of the hardeners, liberating NCO groups. The liberated NCO groups then react with the OH groups of the polyester to form urethane bonds. The cured coatings are notable for excellent chemical and mechanical properties and chemical resistance.

The 1-component PU stoving enamels of the present invention can be prepared in suitable mixing units, such as stirred vessels, by simple mixing of the coating components a–d at 80°–100° C. Customary additives, such as pigments, levelling agents, gloss-enhancing agents, antioxidants or heat stabilizers, can likewise be added to the coating solution in a simple known manner.

The one-component stoving enamel can be applied to the items to be coated in accordance with known methods.

Following application, the coats are heated, in order to cure them, at temperatures above the deblocking temperature of the curing agent, i.e. 130°–350° C., preferably 160°–300° C. The resulting coatings then possess the advantages of having outstanding chemical resistance, excellent evenness and good gloss retention on weathering.

Suitable substrates for coating with the present 1-component PU stoving enamels include all those which withstand the curing temperatures indicated without suffering impairment of their mechanical properties. Preferred substrates are those having metal surfaces.

The 1-component PU stoving enamels according to the present invention are used in particular in the field of coilcoating, for weather-stable one-coat and two-coat systems.

Having generally described this invention, a further understanding can be obtained by reference to certain specific examples which are provided herein for purposes of illustration only and are not intended to be limiting unless otherwise specified.

EXAMPLES

Stoving enamels formulated with various catalysts or catalyst combinations exhibit a processable state which lasts for from 14 days to 3 months or more depending on the nature, concentration and composition of the catalysts, and the testing temperature of room temperature (23° C.) or 50° C.

In order to determine the effectiveness and effect of typical PU catalysts on the storage stability of 1-component systems comprising uretdione structures, a variety of catalysts and combinations thereof were employed and tested in comparison.

The choice of catalyst concentrations in the 1component systems was made such that the catalytically accelerated stoving enamels showed a comparatively uniform level of reaction for a marked reduction in the curing times.

Within the comparison period, an evaluation was made of the viscosity characteristics of the liquid coating materials and of changes in the specific, physical properties of the resulting films, which were cured in a convection oven for paints.

The storage stability was investigated using a basic clearcoat (formulation I), while for the reactivity adjustment a basic white enamel (formulation II) was employed.

The abbreviations used are shown on the following page.

| ABBREVIATIONS | | | |
|---|---|---|---|
| PE 1 | = Polycaprolactone CAPA 305, | OHN: 310 mg of KOH/g, | Interox Chemical Ltd. |
| PE 2 | = OXYESTER E 1189, | OHN: 120 mg of KOH/g, | Hüls AG |
| ACRY | = SETALUX C 1187, | OHN: 120 mg of KOH/g, | Synthese BV, NL |
| H 1 | = VESTAGON EP-BF 1300, | NCO content, latent: 12.3% | Hüls AG |
| H 2 | = VESTAGON EP-BF 1540, | NCO content, latent: 15 ± 1%, | Hüls AG |
| DBU | = Diazabicycloundecene, | | Air-Products |
| DBTL | = Dibutyltin dilaurate, | | Ciba-Geigy AG |
| COSCAT 83 | = Bismuth neododecanoate, | | Coscan-Chemie |
| $TiO_2$,rutile | = KRONOS 2310, | | Kronos Titan |
| MODAFLOW | = Levelling agent, | | Monsanto |
| SOLVESSO 100 | = Mixture of aromatics, $C_9$—$C_{10}$-alkylbenzenes, | | Esso |
| DBE | = Dibasic ester, | | Du Pont |
| MOPA | = 1-Methoxy-2-propyl acetate, | | BASF AG |
| BYK 331 | = Levelling agent | | BYK- Chemie |
| TINUVIN 292 | = UV stabilizer | | Ciba-Geigy AG |
| TINUVIN 900 | = UV stabilizer | | Ciba-Geigy AG |

| Basic coating systems | | |
|---|---|---|
| | Formulation I [% by mass] | Formulation II [% by mass] |
| PE 1 | 14.1 | 10.7 |
| H 1 | 66.4 | 50.5 |
| TiO$_2$, P.V.C. 19 | — | 26.5 |
| Modaflow, 10% IN BA | — | 1.0 |
| SOLVESSO 100 | 6.5 | 3.8 |
| DBE | 6.5 | 3.8 |
| MOPA | 6.5 | 3.7 |

Since pigmented paint films are more suitable than clearcoat films with respect to the evaluation spectrum of coating-film data, the white paint system of formulation II was adjusted with various catalysts to a comparatively uniform reaction level with respect to the curing conditions and was subjected to a coating test. In order to detect the effects of the various catalysts on the storage stability of the liquid coating materials (as measured by coloration or clouding), clearcoats according to formulation I with identical catalysts and concentrations, based on binder content, were used for this investigation and tested.

When stored at room temperature, the stoving enamels formulated with the bismuth catalyst (COSCAT 83) exhibited very high stability with respect to the processing state.

After storage of the liquid coating materials at room temperature for 3 months or at 50° C. for 6 weeks, resulting coating films show an unchanged profile of physical properties.

Table 1 lists the formulation examples based on formulation II with respect to the catalyst used.

TABLE 1

Effect of catalysis on the curing conditions
Basic Formulation II

| Example | Catalyst | % by mass based on binder | Curing time at [min] | | |
|---|---|---|---|---|---|
| | | | 200° C. | 180° C. | 160° C. |
| 1 | Blank sample | — | 10 | 20 | — |
| 2 | DBTL | 0.3 | 4 | 8 | 25 |
| 3 | Ca octoate/DBTL | 0.4/0.2 | 5 | 10 | 30 |
| 4 | Sn (II) octoate/DBTL | 0.4/0.2 | 6 | 12 | — |
| 5 | Fe (III) acetylacetonate | 0.5 | 5 | 10 | — |
| 6 | DBU | 0.5 | 6 | 10 | 30 |
| 7 | COSCAT 83 | 1.0 | 5 | 10 | 30 |

The essential properties of the coating films, listed in Table 2, are representative, within the bounds of natural variation, of the curing conditions indicated in Table 1.

TABLE 2

Film data of the Formulation Examples 1 to 7

| Exam-ple | CT [µm] | CH | HB | HK [s] | EI [mm] | BI [in dlb] | GG 20° ✶ | GG 60° ✶ |
|---|---|---|---|---|---|---|---|---|
| 1 | 25 | 0 | 125 | 164 | 9 | >80 | 60 | 86 |
| 2 | 24–26 | 0 | 125 | 168 | 8 | >80 | 58 | 88 |
| 3 | 24–27 | 0 | 125 | 168 | 9 | >80 | 40 | 80 |
| 4 | 22–26 | 0 | 125 | 171 | 8 | >80 | 41 | 83 |
| 5 | 24 | 0 | 125 | 167 | 9 | >80 | 62 | 87 |
| 6 | 25–28 | 0 | 125 | 169 | 9 | >80 | 61 | 87 |
| 7 | 24–26 | 0 | 125 | 169 | 9 | >80 | 52 | 87 |

Abbreviations:
CT = coat thickness
CH = cross-hatch, according to DIN 53 151
HB = Buchholz impression hardness, according to DIN 53 153
HK = König hardness, according to DIN 53 157
EI = Erichsen indentation, according to DIN 53 156
BI = ball impact, according to ASTM D-2794/84
GG = Gardner gloss, according to ASTM D-523

Tables 3–6 summarize the effect of the catalyst identity on the storage stability of the liquid stoving enamels. Clearly evident in these Tables is the differing action of the catalysts consisting of different chemical compounds. Testing was carried out on unpigmented stoving enamels (CC 1–CC 7) which were formulated in accordance with formulation I with the addition of catalysts. The parameters investigated were the viscosity characteristics over a period of 3 months and, in parallel therewith, the curing characteristics, as well as the physical properties and resistance to methylethyl ketone (MEK).

TABLE 3

Effect of catalysis on the viscosity, storage at room temperature
Formulation Examples

| Storage time at room temperature | CC 1 | CC 2 | CC 3 | CC 4 | CC 5 | CC 6 | CC 7 |
|---|---|---|---|---|---|---|---|
| | Viscosity of the stored clearcoats at 23° C. | | | | | | |
| Initial level | 495 | 430 | 460 | 430 | 380 | 420 | 380 |
| 1 week | 500 | 430 | 480 | 430 | 500 | gels | 380 |
| 1 month | 500 | 450 | 600 | 440 | gels | | 390 |
| 2 months | 510 | 470 | 1000 | 460 | | | 390 |
| 3 months | 520 | 500 | 1400 | 470 | | | 400 |

CC = clearcoats
CC 1 = 0
CC 2 = 0.3 DBTL
CC 3 = 0.4/0.2 Ca octoate/DBTL % by mass based
CC 4 = 0.4/0.2 tin(II) octoate/DBTL on binder
CC 5 = 0.5 FE(III) acetylacetonate
CC 6 = 0.5 DBU
CC 7 = 1.0 COSCAT 83

TABLE 4

Effect of catalysis on the viscosity, storage at 50° C.
Formulation Examples

| Storage time at 50° C. | CC 1 | CC 2 | CC 3 | CC 4 | CC 5 | CC 6 | CC 7 |
|---|---|---|---|---|---|---|---|
| | Viscosity of the stored clearcoats at 23° C. [mPa · s] | | | | | | |
| Initial level | 495 | 430 | 460 | 430 | 380 | 420 | 380 |
| 1 day | 500 | 450 | 490 | 430 | 390 | gels | 380 |
| 3 days | 500 | 470 | 550 | 440 | 560 | | 380 |
| 7 days | 510 | 500 | 630 | 470 | 1200 | | 400 |

TABLE 4-continued

Effect of catalysis on the viscosity, storage at 50° C.
Formulation Examples

| Storage time at 50° C. | CC 1 | CC 2 | CC 3 | CC 4 | CC 5 | CC 6 | CC 7 |
|---|---|---|---|---|---|---|---|
| | Viscosity of the stored clearcoats at 23° C. [mPa · s] | | | | | | |
| 2 weeks | 515 | 580 | 830 | 500 | gels | | 400 |
| 3 weeks | 520 | 630 | 1180 | 540 | | | 410 |
| 4 weeks | 530 | 670 | 1660 | 570 | | | 430 |
| 5 weeks | 560 | 730 | 1800 | 610 | | | 440 |
| 6 weeks | 590 | 770 | 3100 | 640 | | | 440 |
| 7 weeks | 600 | 820 | 7000 | 650 | | | 440 |
| 8 weeks | 610 | 830 | gels | 660 | | | 450 |

Examples of IPDI-based, one-component stoving enamels, containing uretdione groups, which are formulated with commercial paint polyols and catalyzed with COSCAT 83.

In Examples 8–9, an acrylate resin polyol was used, and in Examples 10–11 a polyester polyol was processed which is used in the coil-coating sector.

In Example 12 a polycaprolactone was combined with a commercial IPDI-based uretdione resin.

Table 7 summarizes the compositions (Examples 8–12) of various stoving enamel formulations.

Table 8 contains the curing conditions and major film data of the coating formulations from Table 7.

TABLE 5

Effect of catalysis on film hardness and chemical resistance
Formulation Examples

| Storage time at room tempera- ture | CC 1 | | CC 2 | | CC 3 | | CC 4 | | CC 5 | | CC 6 | | CC 7 | |
|---|---|---|---|---|---|---|---|---|---|---|---|---|---|---|
| | HK | MEK -T | HK | MEK -T | HK | MEK -T | HK | MEK- T | HK | MEK- T | HK | MEK- T | HK | MEK- T |
| Initial level | 201 | 120 | 202 | >150 | 203 | >150 | 203 | >150 | 203 | >150 | 202 | >150 | 203 | >150 |
| 1 week | 200 | 120 | 203 | >150 | 202 | >150 | 201 | >150 | 202 | 100 | gels | | 204 | >150 |
| 1 month | 198 | 120 | 200 | >150 | 204 | >150 | 203 | >150 | gels | | | | 203 | >150 |
| 2 months | 193 | 120 | 196 | >150 | 198 | >150 | 197 | >150 | | | | | 200 | >150 |
| 3 months | 195 | 120 | 202 | >150 | 200 | >150 | 202 | >150 | | | | | 202 | >150 |

HK = König hardness
MEK-T = resistance to MEK, chemical resistance

TABLE 6

Effect of catalyst on film hardness and chemical resistance
Formulation Examples

| Storage time at 50° C. | CC 1 | | CC 2 | | CC 3 | | CC 4 | | CC 5 | | CC 6 | | CC 7 | |
|---|---|---|---|---|---|---|---|---|---|---|---|---|---|---|
| | HK | MEK -T | HK | MEK -T | HK | MEK -T | HK | MEK- T | HK | MEK- T | HK | MEK- T | HK | MEK- T |
| Initial level | 203 | 120 | 200 | >150 | 203 | >150 | 207 | >150 | 203 | >150 | 202 | >150 | 203 | >150 |
| 1 day | 203 | 120 | 200 | >150 | 206 | >150 | 200 | >150 | 203 | 74 | gels | | 204 | >150 |
| 3 days | 203 | 120 | 204 | >150 | 200 | >150 | 209 | >150 | 192 | 70 | 204 | | > | 150 |
| 7 days | 203 | 120 | 202 | >150 | 202 | >150 | 204 | >150 | 151 | 68 | | | 209 | >150 |
| 2 weeks | 200 | 73 | 190 | >150 | 200 | >150 | 200 | >150 | gels | | | | 203 | >150 |
| 3 weeks | 190 | 50 | 175 | >150 | 192 | >150 | 200 | >150 | | | | | 207 | >150 |
| 4 weeks | 175 | 83 | 150 | 70 | 190 | >150 | 188 | 140 | | | | | 198 | >150 |
| 5 weeks | 171 | 80 | 134 | 40 | 100 | 70 | 176 | 40 | | | | | 207 | >150 |
| 6 weeks | 168 | 80 | 122 | 60 | 110 | 65 | 175 | 40 | | | | | 202 | >150 |
| 7 weeks | 165 | 47 | 115 | 50 | 100 | 60 | 175 | 48 | | | | | 193 | 84 |
| 8 weeks | 155 | 35 | 108 | 30 | gels | | 174 | 40 | | | | | 206 | 74 |

TABLE 7

| Components | Examples [% by mass] | | | | |
|---|---|---|---|---|---|
| PE 1 | | | | | 18.9 |
| ACRY 1 | 37.2 | 27.3 | | | |
| PE 2 | | | 39.1 | 29.5 | |
| H 1 | 36.7 | 26.8 | 32.5 | 24.5 | |
| H 2 | | | | | 48.8 |
| TiO$_2$, P.V.C. 19 | | 24.4 | | 24.6 | |
| MODAFLOW | | 0.1 | | 0.1 | |
| BYK 331 | | 0.2 | 0.2 | | 0.2 |
| TINUVIN 292 | | | 0.2 | | |
| TINUVIN 900 | | | 0.2 | | |
| DBE/SOLVESSO/MOPA 1:1:1 | 25.7 | 20.9 | 27.4 | 21.0 | 31.6 |
| COSCAT 83 | 0.4 | 0.3 | 0.4 | 0.3 | 0.5 |

The viscosity established is about 60 sec measured in the DIN 4 cup at 20° C.

TABLE 8

| | Examples | | | | |
|---|---|---|---|---|---|
| | 8 | 9 | 10 | 11 | 12 |
| Curing, min/°C. | 5/200 | 5/200 | 1/300 | 1/300 | 6/200 |
| CH | 0 | 0 | 0 | 0 | 0 |
| HB | 111 | 125 | 125 | 125 | 111 |
| EI | 9.5 | 9 | 9 | 9 | 10 |
| HK | 168 | 150 | 200 | 180 | 203 |
| BI | >80 | 70 | 70 | 60 | >80 |
| GG, 60° * | — | 83 | — | 87 | — |

The films were applied using spiral doctor blades to bonderized sheet steel 1 mm thick, and were stoved in a paint convection oven.

The cured coating films should excellent properties with respect to flexibility, adhesion and hardness.

This application is based on German Patent Application 195 32 294.0, filed with the German Patent Office on Sep. 1, 1995, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters: Patent of the United States is:

1. A liquid one-component PU stoving enamel comprising
   a) a hydroxyl-containing polymer having a hydroxyl number of from 10 to 300 mg of KOH/g.
   b) a partially or totally blocked polyisocyanate containing uretdione groups and prepared from isophorone diisocyanate,
   c) an organic bismuth compound having the following formula:

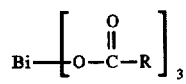

wherein R is a linear, branched or cyclic aliphatic hydrocarbon radical having from 1 to 16 carbon atoms,
   d) an organic solvent or mixture of two or more organic solvents, wherein components a and b are present in a total (a+b) amount of from 40 to 70 parts by weight based on total composition weight, component c is present in an amount of from 0.5 to 5 parts by weight based on total composition weight; and component d is present in an amount of from 30 to 60 parts by weight based on total composition weight; and wherein a and b are each present in amounts sufficient to provide an OH/NCO equivalents ratio of from 0.8 to 1.2 NCO equivalents of component b per OH equivalent of component a.

2. The liquid one-component PU stoving enamel as claimed in claim 1, wherein the hydroxyl-containing polymer has a hydroxyl number of from 25 to 150 mg of KOH/g.

3. The liquid one-component PU stoving enamel as claimed in claim 1, wherein the polyisocyanate is chain-extended with one or more glycols.

4. The liquid one-component PU stoving enamel as claimed in claim 1, wherein the aliphatic hydrocarbon radical is linear or branched.

5. The liquid one-component PU stoving enamel as claimed in claim 1, further comprising one or more components selected from the group consisting of dyes, fillers, gloss-enhancing agents, pigments, heat stabilizers, UV stabilizers, antioxidants and levelling agents.

6. The liquid one-component PU stoving enamel as claimed in claim 1, wherein said hydroxyl-containing polymer is a polyester prepared by reaction of a polycarboxylic acid selected from the group consisting of aliphatic, cycloaliphatic and aromatic polycarboxylic acids, their ester, anhydride and amide derivatives and mixtures thereof, with a diol or polyol.

7. The liquid one-component PU stoving enamel as claimed in claim 6, wherein said polycarboxylic acid is a member selected from the group consisting of oxalic acid, succinic acid, glutaric acid, 2,2-dimethylglutaric acid, adipic acid, 2,2,4- and 2,4,4-trimethyladipic acid, sebacic acid, dodecanedicarboxylic acid, terephthalic acid, methylterephthalic acid, 2,5- and 2,6-dimethylterephthalic acid, chloroterephthalic acid, 2,5-dichloroterephthalic acid, fluoroterephthalic acid, isophthalic acid, phthalic acid, trimellitic acid, naphthalenedicarboxylic acid, phenylenediacetic acid, 4-carboxyphenoxyacetic acid, m- and p-terphenyl-1,4"-dicarboxylic acid, dodecahydrodiphenic acid, tetrahydrophthalic acid, hexahydrophthalic acid, hexahydroterephthalic acid, 4,4'-diphenic acid, 2,2'- and 3,3'-dimethyl-4,4'-diphenic acid, 2,2'-dibromo-4,4'-diphenic acid, bis(4-carboxyphenyl)methane, 1,1- and 1,2-bis(4-carboxyphenyl)ethane, 2,2-bis(4-carboxyphenyl)propane, 1,2-bis(4-carboxyphenoxy)ethane, bis-4-carboxyphenyl ether, bis-4-carboxyphenyl sulfide, bis-4-carboxyphenyl ketone, bis-4-carboxyphenyl sulfoxide, bis-4-carboxyphenyl sulfone, 2,8-dibenzofurandicarboxylic acid, 4,4'-stilbenedicarboxylic acid and octadecahydro-m-terphenyl-4,4"-dicarboxylic acid.

8. The liquid one-component PU stoving enamel as claimed in claim 3, wherein the polyisocyanate and one or more glycols are used in a ratio to provide a NCO/OH ratio of from 1:0.5 to 1:0.9.

9. The liquid one-component PU stoving enamel as claimed in claim 3, wherein the polyisocyanate and one or more glycols are used in a ratio to provide a NCO/OH ratio of from 0.5:1 to 0.9:1.

10. A process for preparing a liquid one-component PU stoving enamel comprising:
    reacting
    a) a hydroxyl-containing polymer having a hydroxyl number of from 10 to 300 mg of KOH/g, b) a partially or totally blocked polyisocyanate containing uretdione groups and prepared from isophorone diisocyanate, and c) an organic bismuth compound having the following formula:

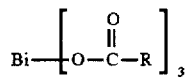

wherein R is a linear, branched or cyclic aliphatic hydrocarbon radical having 1 to 16 carbon atoms, in the presence of d) an organic solvent or mixture of two or more organic solvents, wherein components a and b are present in a total amount (a+b) of from 40 to 70 parts by weight based on total composition weight, component c is present in an amount of from 0.5 to 5 parts by weight based on total composition weight and component d is present in an amount of from 30 to 60 parts by weight based on total composition weight; and wherein components a and b are present in amounts sufficient to provide an OH/NCO equivalents ratio of from 0.8 to 1.2 NCO equivalents of component b per OH equivalent of component a.

11. The process as claimed in claim 10, wherein the hydroxyl-containing polymer has a hydroxyl number of from 25 to 150 mg of KOH/g.

12. The process as claimed in claim 10, wherein the polyisocyanate is chain-extended with one or more glycols.

13. The process as claimed in claim 10, wherein the aliphatic hydrocarbon radical is linear or branched.

14. The process as claimed in claim 10, further comprising adding to the mixture of (a)–(d), one or more components selected from the group consisting of dyes, fillers, gloss-enhancing agents, pigments, heat stabilizers, UV stabilizers, antioxidants and levelling agents.

15. The process as claimed in claim 10, wherein said hydroxyl-containing polymer is a polyester prepared by reaction of a polycarboxylic acid selected from the group consisting of aliphatic, cycloaliphatic and aromatic polycarboxylic acids, their ester, anhydride and amide derivatives and mixtures thereof, with a diol or polyol.

16. The process as claimed in claim 10, wherein said polycarboxylic acid is a member selected from the group consisting of oxalic acid, succinic acid, glutaric acid, 2,2-dimethylglutaric acid, adipic acid, 2,2,4- and 2,4,4-trimethyladipic acid, sebacic acid, dodecanedicarboxylic acid, terephthalic acid, methylterephthalic acid, 2,5- and 2,6-dimethylterephthalic acid, chloroterephthalic acid, 2,5-dichloroterephthalic acid, fluoroterephthalic acid, isophthalic acid, phthalic acid, trimellitic acid, naphthalenedicarboxylic acid, phenylenediacetic acid, 4-carboxyphenoxyacetic acid, m- and p-terphenyl-1,4"-dicarboxylic acid, dodecahydrodiphenic acid, tetrahydrophthalic acid, hexahydrophthalic acid, hexahydroterephthalic acid, 4,4'-diphenic acid, 2,2'- and 3,3'-dimethyl-4,4'-diphenic acid, 2,2'-dibromo-4,4'-diphenic acid, bis(4-carboxyphenyl)methane, 1,1- and 1,2-bis(4-carboxyphenyl)ethane, 2,2-bis(4-carboxyphenyl)propane, 1,2-bis(4-carboxyphenoxy)ethane, bis-4-carboxyphenyl ether, bis-4-carboxyphenyl sulfide, bis-4-carboxyphenyl ketone, bis-4-carboxyphenyl sulfoxide, bis-4-carboxyphenyl sulfone, 2,8-dibenzofurandicarboxylic acid, 4,4'-stilbenedicarboxylic acid and octadecahydro-m-terphenyl-4,4"-dicarboxylic acid.

17. The process as claimed in claim 12, wherein the polyisocyanate and one or more glycols are used in a ratio to provide a NCO/OH ratio of from 1:0.5 to 1:0.9.

18. The process as claimed in claim 12, wherein the polyisocyanate and one or more glycols are used in a ratio to provide a NCO/OH ratio of from 0.5:1 to 0.9:1.

19. A coated coil comprising:

a metal coil having coated thereon a cured one-component PU stoving enamel, wherein the cured one component PU stoving enamel is prepared from a liquid one-component PU stoving enamel comprising:

a) a hydroxyl-containing polymer having a hydroxyl number of from 10 to 300 mg of KOH/g, b) a partially or totally blocked polyisocyanate containing uretdione groups and prepared from isophorone diisocyanate, c) an organic bismuth compound having the following formula:

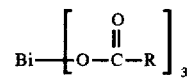

wherein R is a linear, branched or cyclic aliphatic hydrocarbon radical having from 1 to 16 carbon atoms, d) an organic solvent or mixture of two or more organic solvents, wherein components a and b are present in a total (a+b) amount of from 40 to 70 parts by weight based on total composition weight, component c is present in an amount of from 0.5 to 5 parts by weight based on total composition weight; and component d is present in an amount of from 30 to 60 parts by weight based on total composition weight; and wherein a and b are each present in amounts sufficient to provide an OH/NCO equivalents ratio of from 0.8 to 1.2 NCO equivalents of component b per OH equivalent of component a.

* * * * *